No. 797,891. PATENTED AUG. 22, 1905.
M. A. G. HIMALAYA.
SOLAR APPARATUS FOR PRODUCING HIGH TEMPERATURES.
APPLICATION FILED AUG. 30, 1901.

7 SHEETS—SHEET 1.

WITNESSES:
W. M. Avery
C. E. Tielske

INVENTOR
Manuel A. G. Himalaya
BY
ATTORNEYS

No. 797,891. PATENTED AUG. 22, 1905.
M. A. G. HIMALAYA.
SOLAR APPARATUS FOR PRODUCING HIGH TEMPERATURES.
APPLICATION FILED AUG. 30, 1901.
7 SHEETS—SHEET 2.
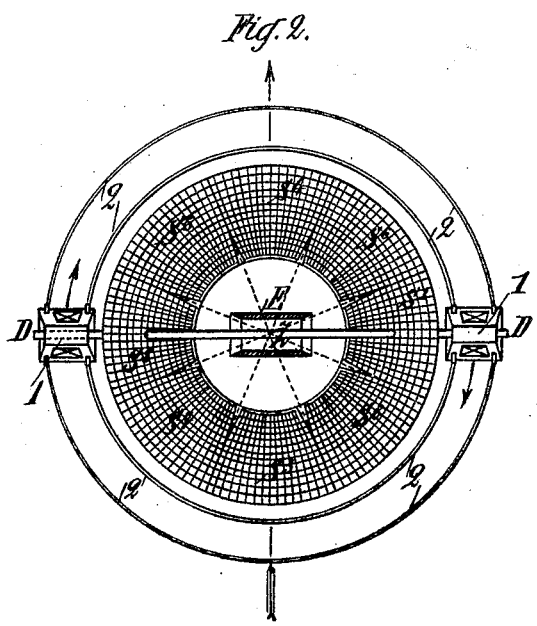
Fig. 2.
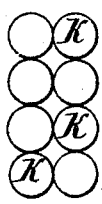
Fig. 1ᵃ
Fig. 1ᵇ
Fig. 1ᶜ
WITNESSES:
W. M. Avery
C. E. Holske
INVENTOR
Manuel A. G. Himalaya
BY
[signature]
ATTORNEYS.

No. 797,891. PATENTED AUG. 22, 1905.
M. A. G. HIMALAYA.
SOLAR APPARATUS FOR PRODUCING HIGH TEMPERATURES.
APPLICATION FILED AUG. 30, 1901.

7 SHEETS—SHEET 3.

WITNESSES.
W. M. Avery
C. E. Holske

INVENTOR
Manuel A. G. Himalaya
BY
ATTORNEYS.

No. 797,891. PATENTED AUG. 22, 1905.
M. A. G. HIMALAYA.
SOLAR APPARATUS FOR PRODUCING HIGH TEMPERATURES.
APPLICATION FILED AUG. 30, 1901.

7 SHEETS—SHEET 4.

WITNESSES:
W. M. Avery
C. E. Holake

INVENTOR
Manuel A. G. Himalaya
BY
Munn
ATTORNEYS.

No. 797,891. PATENTED AUG. 22, 1905.
M. A. G. HIMALAYA.
SOLAR APPARATUS FOR PRODUCING HIGH TEMPERATURES.
APPLICATION FILED AUG. 30, 1901.

7 SHEETS—SHEET 5.

WITNESSES:
W. M. Avery
C. E. Holske

INVENTOR
Manuel A. G. Himalaya
BY Munn
ATTORNEYS.

UNITED STATES PATENT OFFICE.

MANUEL ANTONIO GOMES HIMALAYA, OF BOULOGNE, FRANCE.

SOLAR APPARATUS FOR PRODUCING HIGH TEMPERATURES.

No. 797,891.     Specification of Letters Patent.     Patented Aug. 22, 1905.

Application filed August 30, 1901. Serial No. 73,835.

*To all whom it may concern:*

Be it known that I, MANUEL ANTONIO GOMES HIMALAYA, engineer, a subject of the King of Portugal, residing at 13 Rue de Buzenval, Boulogne-sur-Seine, Department of Seine, Republic of France, have invented a certain new and useful Solar Apparatus for Producing High Temperatures, of which the following is a full, clear, and exact description.

This invention relates to a solar apparatus for producing high temperatures, particularly in the metallurgical and chemical researches which necessitate the use of temperatures higher than those of ordinary furnaces, including the electrical furnace.

The apparatus comprises a reflecting-surface arranged to cause the solar rays to converge upon a confined focus placed in the center of a furnace, crucible, or other receiver, this furnace or other receptacle being, if desired, placed completely outside the reflecting system.

It comprises, besides, means for adjusting or setting the apparatus so as to maintain the convergence of the rays upon the focus selected whatever be the height of the sun above the horizon.

It comprises also a kind of furnace or heat-receiver specially constructed for the said purpose of my invention.

I now proceed to describe my arrangement, reference being made to the accompanying drawings, upon which—

Figure 1:
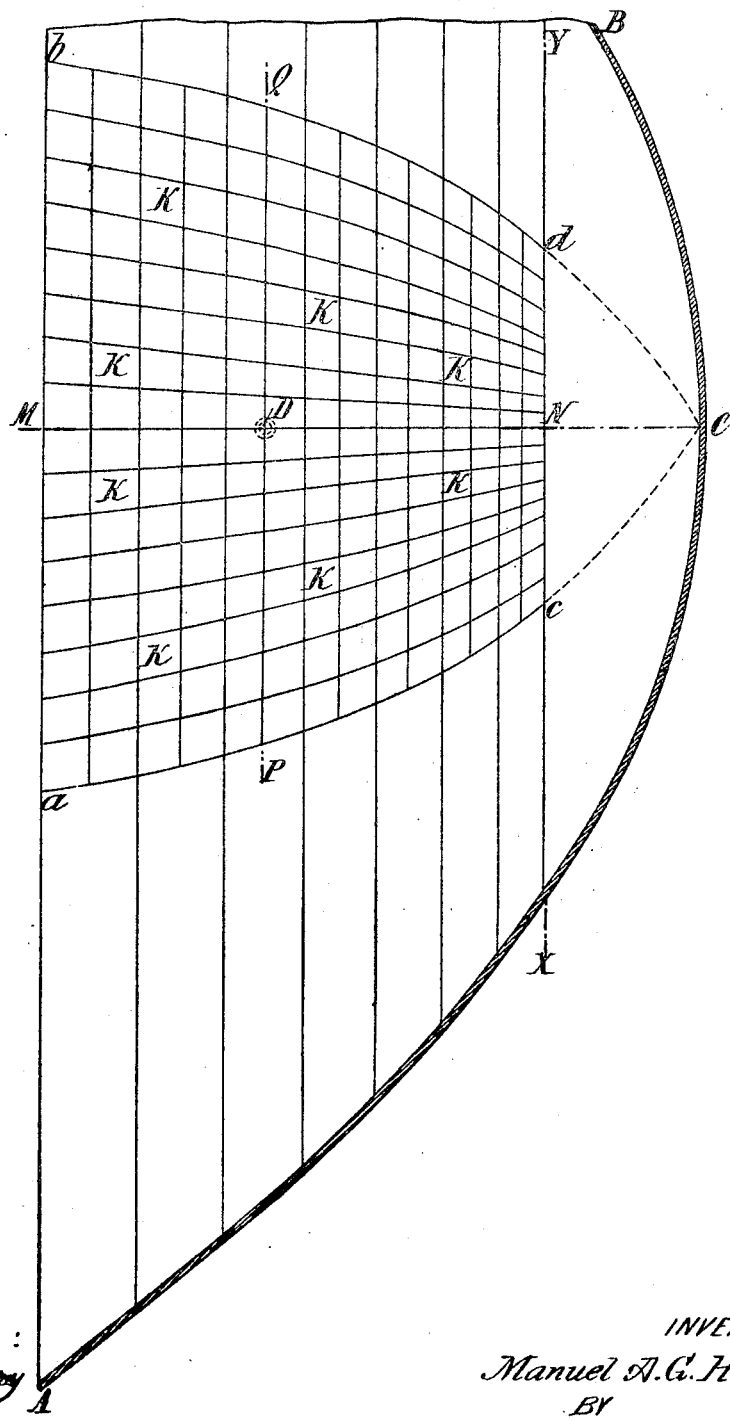
Figure 3:
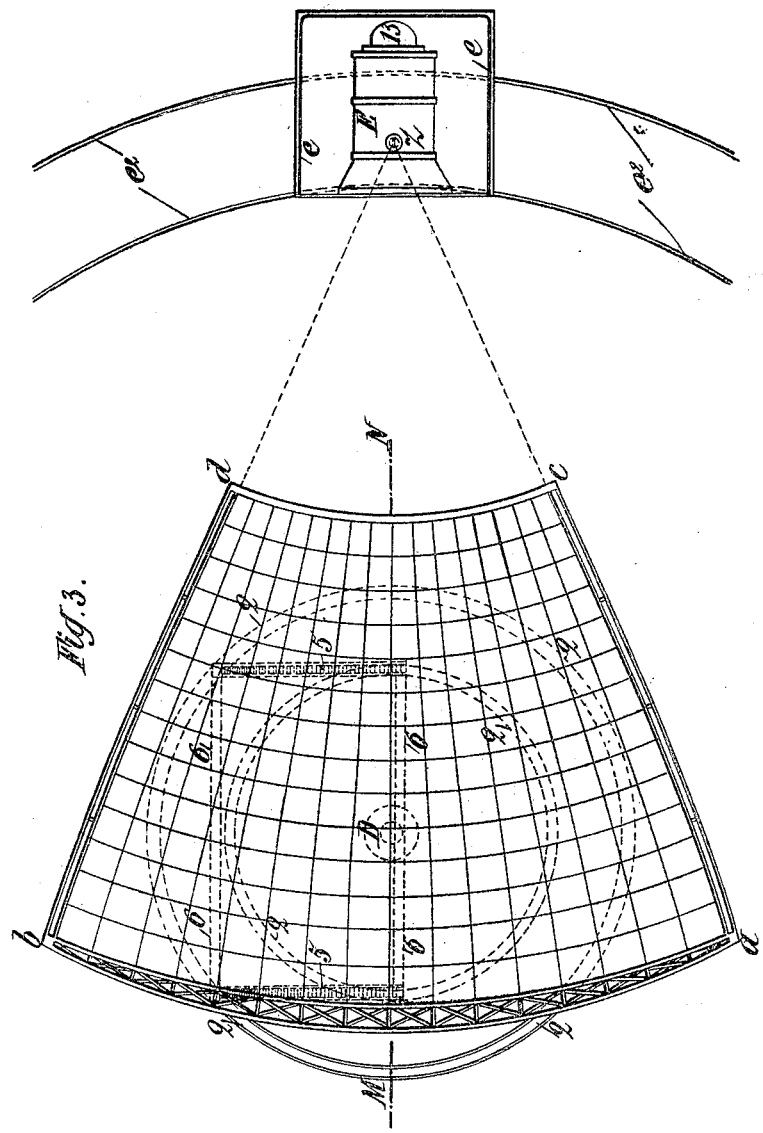
Figure 4:
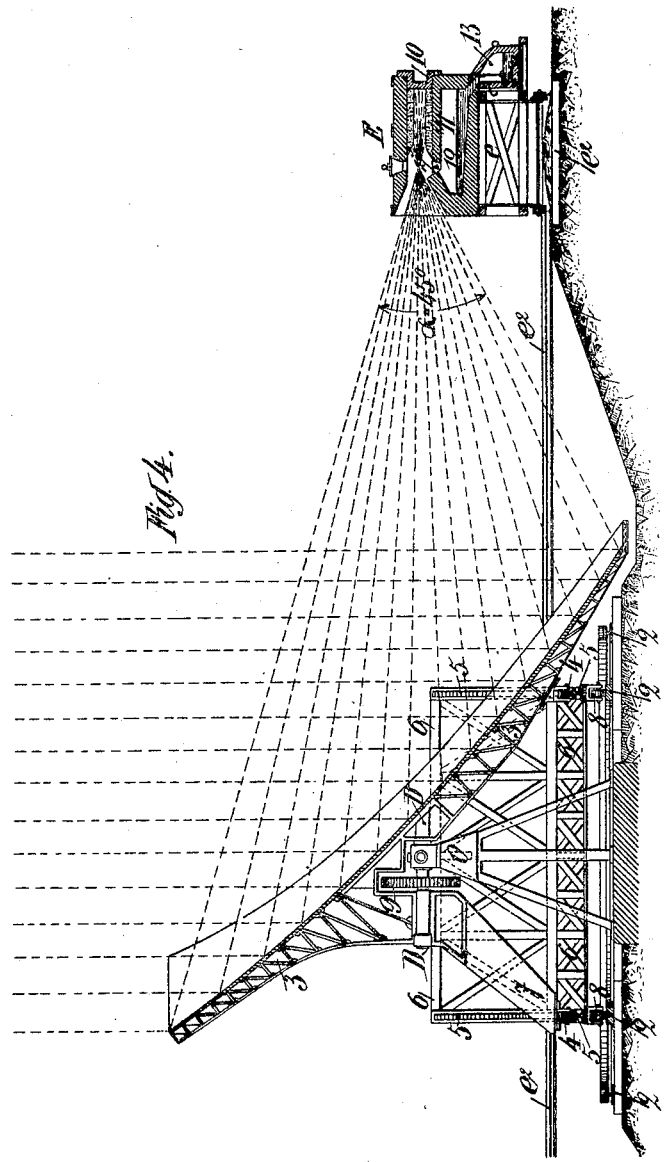
Figure 5:
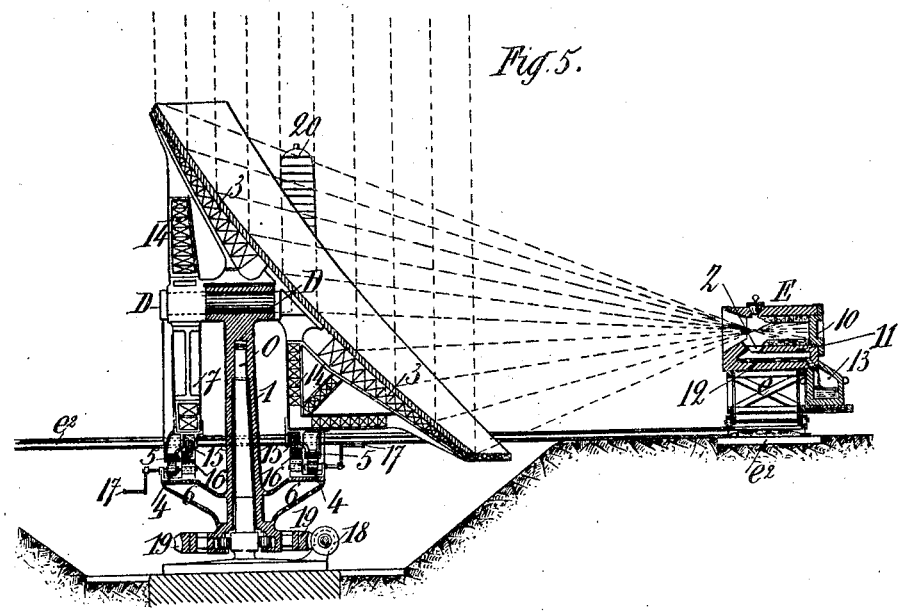
Figure 6:
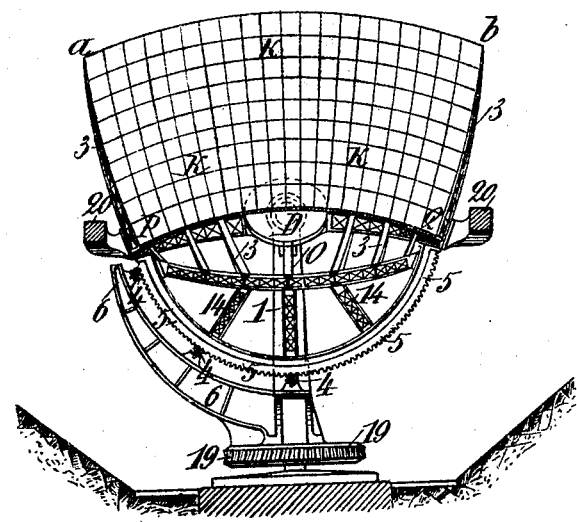
Figure 7:
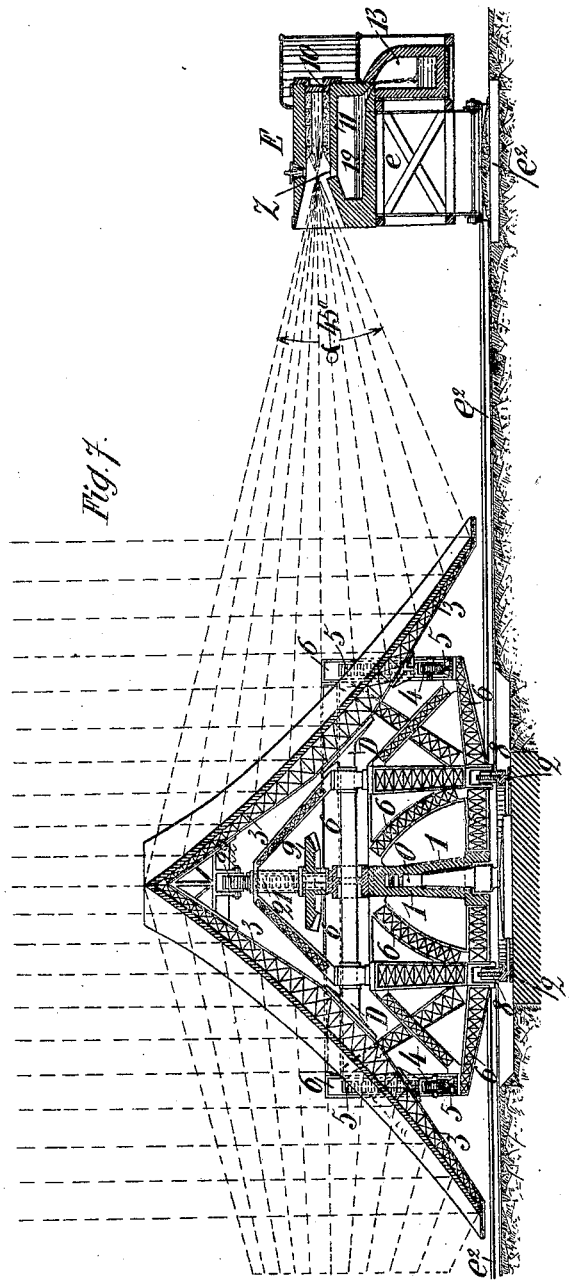
Figure 8:
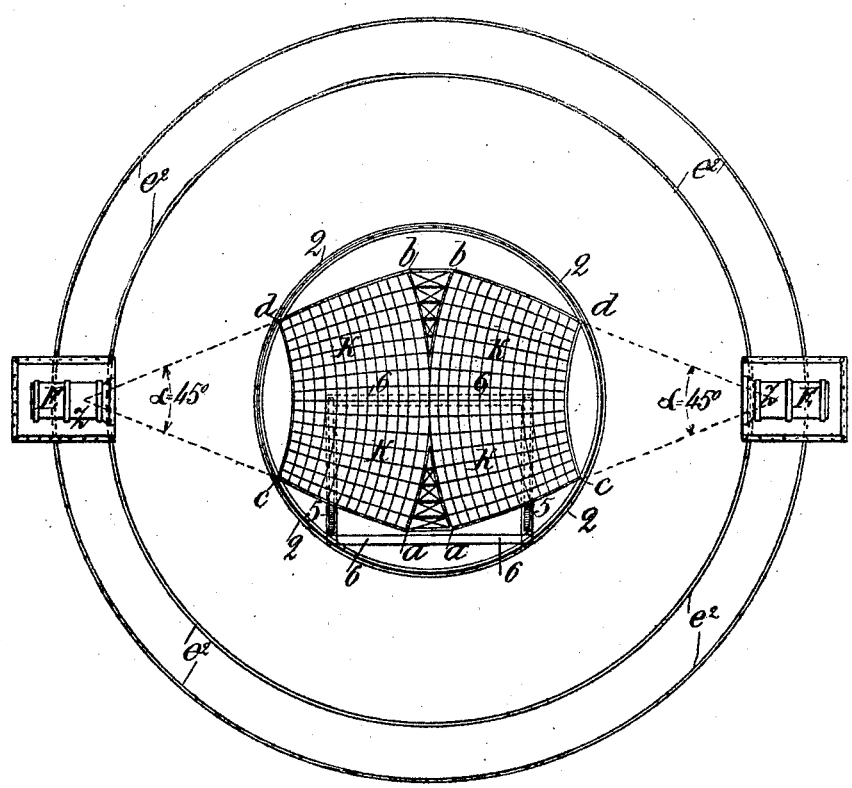

Figure 1 is a section through the axis of a paraboloid of revolution A B C, of which the part near the vertex is cut along X Y perpendicularly to the axis and in which a truncated sector $a\ b\ c\ d$, forming an essential part of the apparatus, is cut out. Figs. $1^a$, $1^b$, and $1^c$ are views illustrating modifications in the shape of the elements forming the reflector. Fig. 2 shows in plan and upon a reduced scale the same truncated paraboloid A B X Y of Fig. 1 divided into eight sectors $S'$ to $S^8$, mounted upon a horizontal axis D D, arranged perpendicularly to the axis of the paraboloid of revolution at the level of the focus Z and supported by means of two columns 1 1, movable upon the circular track 2. Fig. 3 shows in plan and in the working position the truncated paraboloid-sector $a\ b\ c\ d$ of Figs. 1 and 2, directing the solar rays within a crucible E, the sun being vertical. Fig. 4 is a vertical section upon line M N of Fig. 3. Fig. 5 is a modified form of the arrangement shown in Fig. 4. Fig. 6 is a front view of the reflecting system of Fig. 5 and in section upon line P Q of Fig. 1. Fig. 7 shows, in part vertical section, two reflecting systems placed back to back in such a manner as to form two foci in two furnaces symmetrically opposite. Fig. 8 is a plan view, on a reduced scale, of the device shown in Fig. 7.

The essential feature of the invention consists in the use of a reflecting-surface formed by a sector of a paraboloid of revolution $a\ b\ c\ d$, Fig. 1, capable of reflecting a conical pencil of solar rays $a\ b$ Z, Figs. 2 to 8, having an angle at the vertex sufficiently acute for the focus Z to be formed at the center of the furnace or other receiver E and to produce a very high temperature. In point of fact, the paraboloid of revolution and similar surfaces, although being the ideal form of optical apparatus for concentrating the solar rays upon a physically-perfect focus, cannot form a focus capable of practical use, because the rays reflected reaching the focus from all sides of the figure cannot be concentrated upon the center of a furnace or receiver for heating. They can heat only around and outside a crucible or a boiler. In this manner the temperatures developed are relatively small, and the losses of heat through radiation and reflection are very important. My invention is based upon the principle of the resolving of the paraboloid of revolution into as many parts as may be necessary for obtaining a portion of a paraboloid capable of producing a focus practically and easily usable in metallurgical researches and in all branches of industrial tests where very high temperatures are required. This result is attained by cutting at the vertex a paraboloid of revolution upon line X Y, Fig. 1, and by dividing the paraboloidal frustum so obtained into, for example, eight parts or sectors $S'$ to $S^8$, Fig. 2, and by suitably adjusting or setting one of these sectors, as will be hereinafter seen. The aperture or arc of this paraboloidal sector $a\ b\ c\ d$, which for greater simplicity I shall term the "reflector," Figs. 1, 2, and 3, is preferably about forty-five degrees, but may be larger or smaller, according to circumstances. This sector may be cut off at one or more sides or upon all sides, in such case assuming the form of either a frustum of a paraboloidal sector, which is that shown upon the drawings, or a circle, an ellipse, a polygon, or other shape. This reflector may be formed of one or more parts or elements of a paraboloid, the shape of which may be varied—that is to say, each of the elements forming the reflector may have the shape of a trapezoid K, which is that illustrated in Figs. 1 to 8, or that of a circle, Figs. $1^a$ and $1^b$, or a hexagon, Fig. $1^c$, a triangle, a square, &c. In case the reflector is composed of a number of small elementary reflectors, which will, in fact, be the usual case, the section and the surface of each of them may be plane or curved, spherical, parabolic, polyhedral, &c., according to the dimensions of the apparatus. These small elementary reflectors $k\,k$, Figs. 1, 2, and 3, forming the reflector, are arranged in regular manner upon a support or framework 3 3, Figs. 3 to 8, so that each pencil of solar rays reflected by each one of the small elementary reflectors is directed toward the same igneous zone or focus Z, Figs. 2 to 8, in which the temperature is proportionately higher as the surface of the reflector is greater and the area of the igneous zone or focus Z is more confined. The general shape of this framework 3 3, upon which are placed the small elementary reflectors $k\,k$, Figs. 1, 2, and 3, is that of a section or sector of a paraboloid of revolution, Figs. 1 to 8, or of a paraboloidal polygon, an ellipsoid, a hyperboloid, or the like.

The elementary reflectors $k\,k$, Figs. 1, 2, and 3, are made of silvered glass, polished metals, or any other suitable reflecting material, and they are mounted either fixedly or movably upon the framework 3 3, Figs. 4 to 8, according to whether or not it is wished to vary the focal length. They are illustrated as fixed.

The whole combination forming the reflector is usually provided with two adjustments, so as to maintain the convergence of the rays at the focus Z. Such adjustments for setting the apparatus are shown in Figs. 4 to 8. The first motion is that of rotation around a horizontal axis D; the second is a rotation around a vertical axis O. These two movements, suitably controlled and combined, insure the convergence of the rays at the focus Z, whatever be the altitude of the sun, according to the hour of day and the time of year in all latitudes. From the constructional point of view the direction of these movements relatively to the axis of the sun or solar pencil and to the radius of the earth at the point in question varies according to the different methods of carrying out the invention, and consequently the position of the axes D and O, especially D, can be equally varied. As a general rule, whatever be the method of setting the apparatus, the mean inclination of the reflector to the sun is preferably forty-five degrees; but it may be greater or less according to circumstances. By way of example I will describe some arrangements by means of which the reflector can be adjusted in various ways. To explain the differences between and the objects of these various arrangements, I now refer to Fig. 2 of the drawings, showing the frustum of a paraboloid of revolution mounted upon a horizontal axis D, passing through the focus Z perpendicularly to the axis of revolution and supported by two vertical columns or frames 1 1, movable upon the circular rails 2, placed concentrically around the apparatus. By causing this paraboloidal frustum to revolve about the horizontal axis D and this latter to travel upon the track 2 around the center, so that the axis of the solar pencil remains a prolongation of the axis of the paraboloid, it will be seen that each of the sectors $S'$ to $S^8$ produces a cone of reflected rays having different movements, and consequently foci, in Z, capable of always being located at the center of a furnace E or any other suitable device affording a concavity. The arrangement shown in Fig. 2 having these two movements of rotation, each cone of rays reflected by each of the sectors $S'$ to $S^8$ must also have two movements of rotation; but since the axis D passes through the focus Z perpendicularly to the axis of rotation the cone of rays reflected by the two sectors $S'$ and $S^2$ revolves, because its axis is the same as the axis D. The focus provided by these sectors $S'$ and $S^2$ thus remains in the prolongation of the always horizontal axis, whatever be the position of the sun, only having when the sun is oblique a movement of rotation which remains parallel to the horizon.

The arrangement of reflector shown in plan, Fig. 3, and in vertical section, Figs. 4 and 5, corresponds with the frustum of the paraboloidal sector $S'$ of Fig. 2 and, as in that case, produces a focus Z, which always remains in the prolongation of the horizontal axis D D, having, like it, a single movement of translation upon the track 2 concentric about the vertical axis O, which renders this applicable, by preference, to metallurgical and chemical researches which necessitate the use of high temperatures.

As will be seen from Figs. 2 and 4, the horizontal axis D always maintains its relative position. It is inclined about forty-five degrees to the normal at the center of the reflector $a\,b\,c\,d$, and the focus Z is in the plane and on a prolongation of this same axis D only describing each day even when the sun is oblique an arc of a circle upon the track 2 from the center formed by the vertical axis O. The movement of rotation of the reflector $a\,b\,c\,d$ around the horizontal axis D is guided or obtained, Fig. 4, by means of pinions 4 4 traveling upon two racks 5 5, arranged as the arcs of a circle struck from the horizontal axis D. These two racks 5 5, Fig. 4, rest upon a suitable framework 6, movable upon the track 2, arranged around the vertical pivot O.

A portion 7 of the framework serves as a counterbalance, maintaining the equilibrium of the apparatus.

The rotatory movement of the reflecting-surface around the vertical axis O is effected by means of rollers 8 upon the rails 2. This movement takes place only when the axis of the solar pencil is oblique relatively to the radius of the earth. When the axis of the solar pencil is vertical, only a movement of rotation around its horizontal axis D is imparted to it, and then (in the equator) the focus Z remains practically fixed during the whole of two days every year.

The two adjustments of this apparatus, as also that of the truck $e$, carrying the crucible E, are obtained by means of suitable gear-wheels or the like, the arrangement of which may be varied according to the motive power, whether human, animal, or mechanical. These gear-wheels are suitably connected with the wheel 9 and rollers 4 and 8 or with other parts of the apparatus.

The minerals or other materials to be melted or treated in the furnace E are inserted, preferably, through a door or an opening 10 in such a manner as to form a tubular wall or casing resting upon the bed 11 of the furnace, which forms a cavity within which the converging rays form a focus while acting directly upon the substances to be treated. The materials fall into a receiver 12, whence they are run off into a pocket or pot 13. The truck carrying the crucible E can be wheeled around a track $e^2$ concentric with the axis O.

Fig. 5 relates to an arrangement similar to that in Fig. 4, but having some modifications facilitating the two rotary movements of the reflector. For this purpose the arrangement for rotating the apparatus around the vertical axis O is supported solely by this latter. The two racks 5 5, arranged centrally from the axis D, are mounted upon frames 14 integral with the skeleton of the reflecting-surface, Figs. 5 and 6, and upon the part 7, acting as a counterbalance, as before stated. These racks 5 5 are supported upon toothed pinions 4, fixed to two frames 6 integral with the pillar 1, turning around the vertical axis O. The reflector may be further supported by means of rollers 15 upon rails 16, mounted upon the same framework 6. In order to effect the rotary movement around the horizontal shaft D, it is sufficient to turn the pinions 4 by means of a crank-handle 17. The rotary movement around the vertical axis O is obtained by means of a worm 18 engaging a worm-wheel 19, secured upon the pillar 1. In this apparatus the center of gravity is brought back to the intersection of the two planes of the axes O and D by means of suitable counterbalances 7 and 20.

Figs. 7 and 8 show in vertical section and in plan an arrangement composed of two reflectors $a\ b\ c\ d$, supported upon the same vertical axis O, resting upon the same horizontal axis D in such a manner that all movements of the two reflectors and of the two cars carrying the crucibles are symmetrical. This form of carrying out the invention is a combination of two apparatus of the kind shown in Figs. 4 and 5, so as to obtain a combined apparatus better balanced as to its movements and more symmetrical in shape than the form shown in Figs. 4 and 5 without the addition of the counterbalances 7 and 20, the two reflectors balancing one another. The rotation of this apparatus around the vertical axis O is guided by rollers 8 upon rails 2 central with the axis O. This movement can be effected by means of pinions, crank-handles, or other suitable operating mechanism engaging either the rollers 8 or the wheel 9, placed above or below the horizontal axis D. The rotation around the horizontal shaft D is guided by the racks 5, placed below the axis D, and rack 21, placed above this axis, these various racks being shaped to the arcs of a circle struck from axis D and supported by the framework 6. This movement may be controlled by acting through the intermediary of suitable gearing or convenient mechanism upon the pinions 4 or upon the pinion 22 of rack 21 or at any other suitable part of the apparatus. This form of the invention affords two foci Z and Z, Figs. 7 and 8, placed symmetrically in prolongations of the horizontal axis D within two crucibles E E and having only a single movement of horizontal rotation upon the track $e^2$ central with the vertical shaft O.

The crucible E may be furnished with special and corresponding movements upon the truck or car $e$, according to requirements necessitated by the various applications of the invention.

It is to be understood that I may make various modifications in my reflecting system and constructional alterations without changing the general idea of my invention and such as are necessitated by its application to different sorts of original researches. I do not, moreover, limit myself beyond the essentials cited to any strict form of the whole forming the reflecting concavity and its components, nor to any fixed type of framework or girders, supports, and other similar parts, nor to any inclusive method of adjusting the reflecting system, nor to the geometrically perfect curve of a paraboloid of revolution. I may, indeed, make use of reflectors formed by cutting out one or more sectors in a figure of revolution consisting of a paraboloid or an approximation to a paraboloid.

Having thus described my invention, what I claim as such, and desire to secure by Letters Patent, is—

1. An apparatus for obtaining high temperatures by means of the convergence of solar rays, comprising a reflecting-surface in the form of a truncated sector of a paraboloid or other figure of revolution, a horizontal axis around which the reflecting-surface is adapted to rotate, the said axis being inclined to the normal at the center of the reflector, and the focus formed by the converging rays being in the plane and on a prolongation of the said axis a vertical axis, around which the reflector is adapted to rotate, a receiver for the material to be treated arranged at the focus formed by the converging rays, means for counterbalancing the apparatus, and means for adjusting the reflecting-surface, as set forth.

2. An apparatus for obtaining high temperatures by means of the convergence of solar rays, comprising two reflecting-surfaces each in the form of a truncated sector of a paraboloid or of other figure of revolution, a vertical axis upon which both of said reflectors are mounted to rotate, a horizontal axis around which the reflectors are adapted to turn, the said reflectors counterbalancing each other, means for imparting movement to the reflectors around the vertical and horizontal axes, and receivers for the material to be treated, as set forth.

3. In an apparatus for obtaining high temperatures by means of the convergence of solar rays, a reflecting-surface in the form of a truncated sector of a paraboloid or other figure of revolution, a horizontal and a vertical axis around which the reflecting-surface is adapted to rotate, the said horizontal axis being inclined to the normal at the center of the reflector and the focus formed by the converging rays being in the plane and on a prolongation of the said axis, and means for adjusting the reflecting-surface, as set forth.

4. An apparatus for obtaining high temperatures by means of the convergence of solar rays, comprising a reflecting-surface in the form of a truncated sector of a paraboloid or other figure of revolution, a horizontal axis around which the reflecting-surface is adapted to rotate, the said horizontal axis being inclined to the normal at the center of the reflector and the focus formed by the converging rays being in the plane and on a prolongation of the said axis, means for guiding and controlling the movement of the reflecting-surface around the horizontal axis, a vertical axis around which the reflector is adapted to rotate, and a receiver for the material to be heated arranged at the focus formed by the converging rays, as set forth.

In testimony that I claim the foregoing as my invention I have signed my name in presence of two subscribing witnesses.

MANUEL ANTONIO GOMES HIMALAYA.

Witnesses:
GUSTAVE DUMONT,
EDWARD P. MACLEAN.